United States Patent
Derclaye et al.

(10) Patent No.: US 8,192,150 B2
(45) Date of Patent: Jun. 5, 2012

(54) METHOD OF MANUFACTURING A TURBOMACHINE ELEMENT AND DEVICE OBTAINED IN THIS WAY

(75) Inventors: Alain Derclaye, Couthuin (BE); Rodolphe Lebrun, Namur (BE)

(73) Assignee: Techspace Aero, Milmort Herstal (BE)

( * ) Notice: Subject to any disclaimer, the term of this patent is extended or adjusted under 35 U.S.C. 154(b) by 640 days.

(21) Appl. No.: 12/343,675

(22) Filed: Dec. 24, 2008

(65) Prior Publication Data
US 2009/0175719 A1    Jul. 9, 2009

(30) Foreign Application Priority Data
Dec. 27, 2007    (EP) .................................... 07150429

(51) Int. Cl.
*F01D 11/00*    (2006.01)
(52) U.S. Cl. ................... 415/174.4; 415/173.1; 29/889.7
(58) Field of Classification Search ............... 415/173.1, 415/173.4, 199.56, 191, 211.2, 174.4; 29/889.7, 29/889.22
See application file for complete search history.

(56) References Cited

U.S. PATENT DOCUMENTS

| 3,070,353 | A | * | 12/1962 | Welsh | 415/209.2 |
| 5,429,478 | A |   | 7/1995 | Krizan et al. | |
| 7,908,867 | B2 | * | 3/2011 | Keller et al. | 60/753 |
| 2003/0206799 | A1 | * | 11/2003 | Scott | 415/209.3 |
| 2004/0086635 | A1 | * | 5/2004 | Grossklaus et al. | 427/140 |
| 2007/0197719 | A1 | * | 8/2007 | Putnam et al. | 524/588 |
| 2008/0081109 | A1 | * | 4/2008 | Johnson et al. | 427/180 |

FOREIGN PATENT DOCUMENTS

| EP | 0 602 631 A1 | 6/1994 |
| GB | 2 207 629 A | 2/1989 |
| GB | 2 388 161 A | 11/2003 |

* cited by examiner

*Primary Examiner* — Caridad Everhart
(74) *Attorney, Agent, or Firm* — Oblon, Spivak, McClelland, Maier & Neustadt, L.L.P.

(57) ABSTRACT

Use of the stator blade platforms for the deposition of a track of adjacent abradable material inside an external turbomachine shell is disclosed. The stator blades are attached to the shell so as to define an annular edge that is substantially continuous and the abradable material is deposited using this edge to delimit a boundary of the track of abradable material.

12 Claims, 1 Drawing Sheet

METHOD OF MANUFACTURING A TURBOMACHINE ELEMENT AND DEVICE OBTAINED IN THIS WAY

BACKGROUND OF THE INVENTION

1. Field of the Invention

The invention relates to a method of manufacturing a turbomachine element and more particularly a subassembly comprising an external annular shell bearing a stator blade stage and an annular track of abradable material facing which the ends of the moving blades of a rotor stage move. The invention relates more particularly to a refinement making it possible to both simplify the formation of the track of abradable material and reduce the axial bulk and the weight of the element, overall.

2. Description of the Related Art

A turbomachine stage, such as, for example, a compression stage in a compressor, is arranged between an external annular shell and an internal annular shell, the shells being coaxial. The fixed stator blades extend between the two shells. The moving blades are driven rotation-wise inside the external annular shell so that the ends of these blades move facing a track of abradable material deposited on the internal surface of the external annular shell, upstream of the stator blades.

Hereinafter in the description the terms "upstream" and "downstream" are used to situate the structural elements relative to each other, taking as reference the direction of flow of the fluid inside the external annular shell.

FIG. 1 represents a known subassembly consisting of the external annular shell 11, the stator blades 13 and the track of abradable material 15. According to this arrangement, the external annular shell 11 has an internal rib 17 which separates an upstream portion 19 where the track of abradable material 15 is located from a downstream portion 21 where the stator blades 13 are fitted. Each blade has a platform 23 sunk into an annular groove 25 of the external annular shell. The rib 17 forms the upstream boundary of this groove. In the example described, the fixed blades 13 are joined to the external annular shell 11 by bolts 27. The final form of the external annular shell, on the internal side, is generally obtained by machining. The annular shell is generally metallic, for example made of aluminum, titanium or steel alloy. The abradable material is often a mixture of aluminum and resin deposited hot (plasma) or cold, or a "RTV" silicone.

BRIEF SUMMARY OF THE INVENTION

One of the objectives of the invention is to simplify the annular external annular shell 11 and in particular to eliminate the rib 17.

The basic idea of the invention entails using the platforms of the stator blades to form a portion of the containment means making it possible to place the abradable material on the internal face of the shell.

More particularly, the invention relates to a method of manufacturing a turbomachine element comprising an external annular shell comprising a first portion provided internally with a track of abradable material and a second portion to which are attached stator blades provided with platforms, characterized in that the stator blades are attached to the shell so that said platforms define an annular edge that is substantially continuous inside said external annular shell and in that the abradable material is deposited inside said first portion using this edge to delimit a boundary of said track of abradable material.

In the example, said first portion is upstream and said second portion is downstream.

This makes it possible to reduce the length of the external annular shell since the rib 17 is eliminated. The invention also makes it possible to manufacture the external annular shell using carbon or glass fibre-based composite material because a practically constant shell thickness can be obtained over the greatest portion of the length of the shell.

According to an advantageous characteristic, the abradable material is injected with finite dimensions. This type of injection is known per se and makes it possible to avoid any subsequent machining.

For example, the abradable material is a silicone-based compound. In these conditions, the material can be in contact with the boundaries of the platforms of the stator blades. There is no need to provide play between the track of abradable material and the platforms. On the contrary, the vibrations can be downed by the silicone.

Obviously, the invention does not preclude depositing another type of abradable material (deposition by hot plasma) or even a silicone-based material injected with non-finite dimensions.

The invention also relates to a turbomachine element comprising an external annular shell comprising an upstream portion provided internally with a track of abradable material and a downstream portion to which are attached stator blades provided with platforms, characterized in that the downstream boundary of said track of abradable material juxtaposes all of the upstream boundaries of said stator blade platforms.

As mentioned previously, the external annular shell can advantageously be made of carbon or glass fibre-based composite material.

The invention also concerns any turbomachine comprising at least one element according to the preceding definition. It applies in particular to a low-pressure compressor of a jet engine.

BRIEF DESCRIPTION OF THE SEVERAL VIEWS OF THE DRAWINGS

The invention will be better understood, and other advantages of the latter will become more clearly apparent in light of the description that follows, given purely by way of examples and given with reference to the appended drawings, in which.

DETAILED DESCRIPTION OF THE INVENTION

Figure 2:
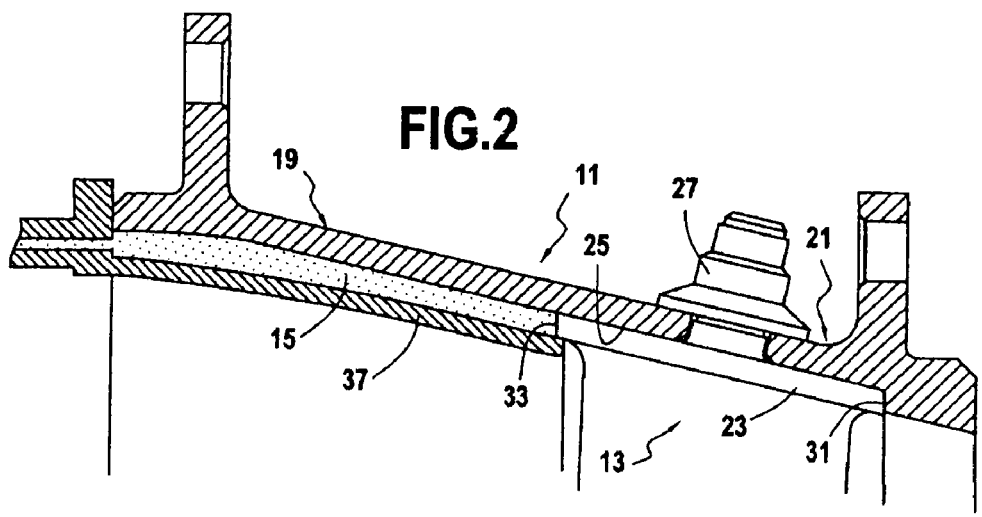
FIG. 2 illustrates a similar turbomachine element, according to the invention, and shows more particularly a phase of the method according to the invention.

The turbomachine element represented in FIG. 2 forms a portion of a compression stage of a compressor. It consists of an external annular shell 11 comprising an upstream portion 19 provided internally with a track of abradable material 15 and a downstream portion 21 to which stator blades 13 are fixed.

Figure 1:
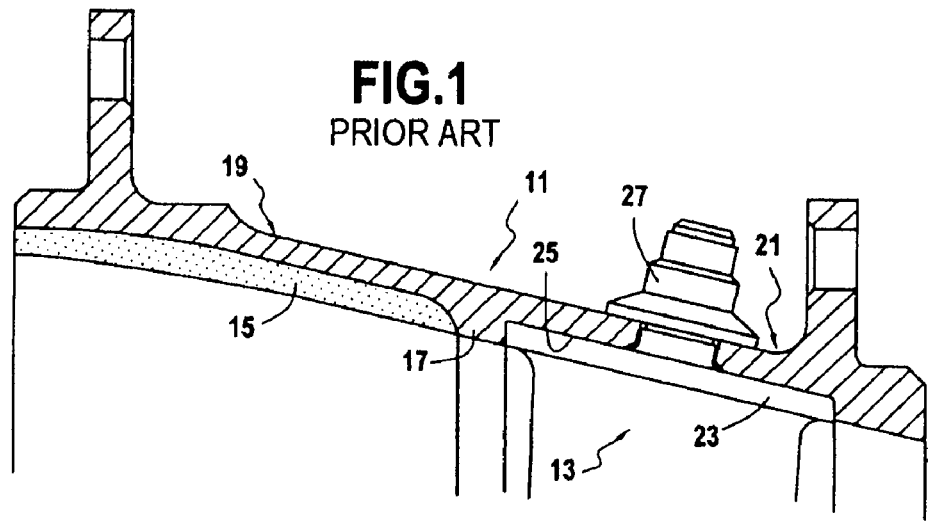
FIG. 1 is a partial axial cross-sectional view of a turbomachine element according to the state of the art.
Figure 3:
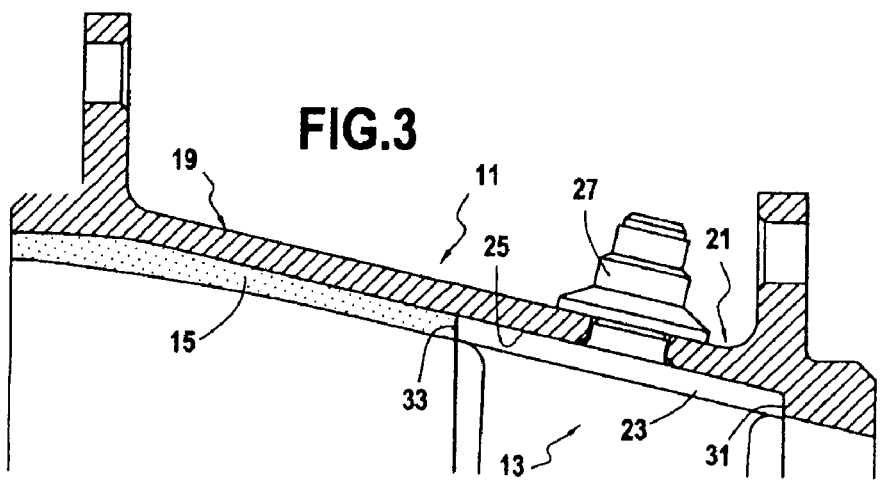
FIG. 3 is a view similar to FIG. 2 illustrating the finished turbomachine element.

Unlike the known device of FIG. 1, the platforms 23 of the stator blades are positioned by contact with just one side inside the shell 11, along a single downstream positioning edge 31. Specifically, the central rib is eliminated. Positioning is therefore easier. The stator blades 13 are fitted side by side using bolts 27. They thus define a substantially continuous annular edge 33 upstream. The presence of this edge is exploited to deposit the abradable material on the internal face of the upstream portion 19 of the shell using this edge to delimit the downstream boundary of the track of abradable material 15. This is what is illustrated in FIG. 2 where it can be seen that the annular edge 33 formed by the platforms 23 constitutes a terminal wall of a mold 37 making it possible to inject the abradable material. In this example, the abradable material is a silicone-based compound. The silicone is injected with finite dimensions so that no subsequent machining is necessary. The removal of the mold 37 after the injection of the abradable material results in the configuration of FIG. 3. The turbomachine element is finished and can be used in the construction of the compressor, the moving blades joined to a rotor (not represented) being positioned facing the track of abradable material 15.

Furthermore, as indicated hereinabove, the external annular shell 11, the form of which is much simpler, with a wall thickness that is practically constant over the greatest portion of its length, can easily be made using non-metallic material, for example using a carbon or glass fiber-based composite material. The use of a silicone-based abradable material enhances the vibratory damping of the platforms.

It is also possible to implement the method with the application of an abradable material by plasma, which generally results in an abradable deposition with non-finite dimensions.

What is claimed is:

1. A method of manufacturing a turbomachine element comprising an external annular shell, the method comprising:
   providing a first portion of said external annular shell internally with a track of abradable material; and
   attaching stator blades, provided with platforms, to a second portion of said external annular shell, the platforms being independent from said external annular shell,
   wherein the stator blades are attached to said external annular shell so that said platforms define an annular edge that is substantially continuous inside said external annular shell, and
   wherein the abradable material is deposited inside said first portion using the annular edge to delimit a boundary of said track of abradable material.

2. The method according to claim 1, wherein said abradable material is injected to finite dimensions.

3. The method according to claim 1, wherein said abradable material is deposited with non-finite dimensions, with subsequent machining.

4. The method according to claim 1, wherein said abradable material is a silicone-based compound.

5. The method according to claim 1, wherein said abradable is applied by plasma spraying.

6. The method according to claim 1, wherein the first portion is covered with a mold prior to the providing of the track of abradable material.

7. The method according to claim 6, wherein the annular edge constitutes a terminal wall of the mold.

8. A turbomachine element comprising an external annular shell comprising:
   an upstream portion of said external annular shell provided internally with a track of abradable material directly in contact with an internal surface of said external annular shell; and
   a downstream portion of said external annular shell to which are attached stator blades provided with platforms independent from said external annular shell,
   wherein a downstream boundary of said track of abradable material juxtaposes all of upstream boundaries of said stator blade platforms.

9. A turbomachine comprising an element according to claim 8.

10. The turbomachine element according to claim 8, wherein said abradable material is a silicone-based compound.

11. The turbomachine element according to claim 10, wherein said abradable material is in contact with all of the upstream boundaries of said platforms.

12. The turbomachine element according to one of claims 8 to 11, wherein said external annular shell is made of carbon or glass fiber-based composite material.

* * * * *